United States Patent
Li et al.

(10) Patent No.: US 8,064,943 B2
(45) Date of Patent: Nov. 22, 2011

(54) METHOD AND APPARATUS FOR CONTROLLING USER'S PARTICIPATION INTO A SESSION IN THE POC SERVICE

(75) Inventors: Lin Li, Shenzhen (CN); Xugang Wu, Shenzhen (CN); Shengting Zhang, Shenzhen (CN); Zheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 449 days.

(21) Appl. No.: 12/235,188

(22) Filed: Sep. 22, 2008
(Under 37 CFR 1.47)

(65) Prior Publication Data
US 2009/0270119 A1    Oct. 29, 2009

Related U.S. Application Data

(63) Continuation of application No. PCT/CN2007/000110, filed on Jan. 11, 2007.

(30) Foreign Application Priority Data

Mar. 22, 2006   (CN) .......................... 2006 1 0024960
Jun. 28, 2006   (CN) .......................... 2006 1 0101003

(51) Int. Cl.
  *H04Q 7/20* (2006.01)
(52) U.S. Cl. ........ 455/518; 455/519; 455/500; 455/517; 455/445; 455/422.1; 370/279; 370/261; 370/259; 370/262; 370/310; 709/203; 709/204
(58) Field of Classification Search .................. 455/518, 455/519, 500, 517, 445, 550.1, 422.1, 403, 455/417, 426.1, 426.2, 414.1–414.4, 412, 455/412.1; 370/279, 261, 259, 262, 310, 370/312, 329, 328, 343; 709/203, 204
See application file for complete search history.

(56) References Cited

U.S. PATENT DOCUMENTS 6,459,892 B2   10/2002   Burgan et al.
(Continued)

FOREIGN PATENT DOCUMENTS

| CN | 1393883 A | 1/2003 |
|---|---|---|
| CN | 1401183 A | 3/2003 |
| CN | 1635765 A | 7/2005 |
| CN | 1643948 A | 7/2005 |

(Continued)

OTHER PUBLICATIONS

"Push to Talk Over Cellular (PoC)—Architecture, Candidate Version 1.0," *Open Mobile Alliance*, 98-136 (2005) Internet Citation http://member.openmobilealliance.org/ftps/Public_documents/POC/Permanent_documents/OMA-AD-PoC-V1_0-20050317-C.zip [retrieved on Sep. 9, 2005].

(Continued)

*Primary Examiner* — Keith Ferguson
(74) *Attorney, Agent, or Firm* — Leydig, Voit & Mayer, Ltd.

(57) ABSTRACT

The present invention discloses a method and an apparatus for controlling user's participation into a session so that the system can control accession to a PoC session requested by anonymous users and restrict an expelled user from joining the session again. Under the present invention, a client in the PoC session sends a request of expelling a user to the control server, with the SSRC identifier or nickname of the user or an anonymous user wildcard carried in the request; according to the received SSRC identifier, nickname or anonymous user wildcard, the control server searches for the corresponding PoC address, and expels the user out of the session as required according to the PoC address. Therefore, the client with the expulsion right can control accession to the PoC session requested by other users, especially anonymous users, thus keeping order of the session. The control server automatically rejects the reattempt of the expelled user according to the rejection list and the rejection policy, thus preventing such users from harassing the PoC session maliciously, and improving the service experience of the user.

16 Claims, 4 Drawing Sheets

U.S. PATENT DOCUMENTS

| | | | |
|---|---|---|---|
| 6,668,169 | B2 | 12/2003 | Burgan et al. |
| 6,928,294 | B2 | 8/2005 | Maggenti et al. |
| 2003/0084103 | A1 | 5/2003 | Weiner et al. |
| 2003/0154249 | A1* | 8/2003 | Crockett et al. ............... 709/204 |
| 2008/0008106 | A1* | 1/2008 | Boberg et al. ................. 370/270 |
| 2008/0096597 | A1 | 4/2008 | Vempati et al. |
| 2008/0311883 | A1 | 12/2008 | Bellora et al. |

FOREIGN PATENT DOCUMENTS

| | | |
|---|---|---|
| WO | WO 2005/107095 A1 | 11/2005 |
| WO | WO 2005/120039 A1 | 12/2005 |

OTHER PUBLICATIONS

Huaiping, "The Principle of Realization of ASP Chatroom Based on WWW," *Gold Journal*, 2(2): 143-146 (Jun. 2000).

Written Opinion of the International Searching Authority in corresponding PCT Application No. PCT/CN2007/000110 (May 17, 2007).

$1^{st}$ Office Action in corresponding European Application No. 07 702 042.8 (Feb. 3, 2010).

$1^{st}$ Office Action in corresponding Chinese Application No. 200610101003.X (Mar. 15, 2011).

"3GPP TS 23.228—3rd Generation Partnership Project; Technical Specification Group Services and System Aspects; IP Multimedia Subsystem (IMS); Stage 2 (Release 6)," Dec. 2005, Version 6.12.0, $3^{rd}$ Generation Partnership Project, Valbonne, France.

"Push to Talk Over Cellular 2 Requirements," Sep. 2, 2005, Draft Version 2.0, Open Mobile Alliance, San Diego, California.

\* cited by examiner

METHOD AND APPARATUS FOR CONTROLLING USER'S PARTICIPATION INTO A SESSION IN THE POC SERVICE

CROSS REFERENCE TO RELATED APPLICATIONS

This application is a continuation of International Patent Application No. PCT/CN2007/000110, filed Jan. 11, 2007, which claims priority to Chinese Patent Application Nos. 200610024960.7 and 200610101003.X, filed with the Chinese Patent Office on Mar. 22 and Jun. 28, 2006 respectively, both entitled "Method for Controlling User's participation into a Session in the PoC Service", all of which are hereby incorporated by reference in their entirety.

FIELD OF THE INVENTION

The present invention relates to the mobile communication technology, and in particular, to a method and an apparatus for controlling user's participation into a session in a Push-to-Talk over Cellular (PoC) service.

BACKGROUND OF THE INVENTION

Mobile communication has become an indispensable part of the life of most people. With the popularization of mobile communication application, people impose higher and higher requirements on voice and data transmission. The 2nd generation mobile telecommunication system represented by the Global System for Mobile communication (GSM) and the Code Division Multiple Access (CDMA) has now exerted the transmission rate to the utmost, and the 3rd generation mobile communication system (3G) capable of transmitting data at a high speed emerges.

IP Multimedia Subsystem (IMS) is an Internet Protocol (IP) multimedia subsystem in a Wideband Code Division Multiple Access (WCDMA) defined in the 3rd Generation Partnership Project (3GPP) Release 5 (R5) standard, and is a target network for the 3G mobile network to implement VoIP and packet-based data and provide uniform multimedia services and applications.

Multiple Network Elements (NEs) of the enable logic function are introduced into the IMS architecture, including: Instant Messaging (IM), presence information service, and Extensible Mark-up Language Document Management Server (XDMS). A multi-service application architecture may be set up through such enable logic function NEs.

The presence technology may be combined with the IM service or the Push To Talk (PTT) service in the mobile data service, namely, applied to the User Equipment (UE) that supports the IM or PTT service.

The PTT enables a UE of the corresponding function to be used as a walkie-talkie, and is a half-duplex communication mode. The UE has a talk key. After pressing the talk key, the user can talk with other users or a group only if in an area covered by the operator's network regardless of the distance.

The Push-to-Talk over Cellular (PoC) is a PTT service implemented on a packet network, as defined by the Open Mobile Alliance (OMA). It uses the Voice over IP (VoIP) technology and the half duplex mode to fulfill the real-time communication requirements of users effectively at a low cost. Through the PoC service, a user may originate a PoC session to a user or a group to implement one-to-one or one-to-many sessions.

The PoC has a set of features similar to the style of the VoIP communication service and the IM service, for example, prompt of online state of a user, and online message. A user may obtain multiple voice services and multimedia services, including:

One-to-one session: A user is allowed to contact another online user selected from an address book immediately.

Temporary group: For a specific purpose, a user can select one or more pals from the online address book to make up a group temporarily and perform a group session. To perform a one-to-one conversation, the user may select any pal in the address book.

Predefined group: For a predefined group such as a sales team, the user may talk with many users in the group only through one key.

Chat group: The user may join or quit a predefined chat group or conference group.

Therefore, groups in a PoC service fall into two types: (1) one type is the group established before a session request is originated. The information on this group is stored in the XDMS and will be used for originating a session in the future. In this circumstance, the session originator originates the session through a group ID. After receiving the request, the server obtains a group name list from the XDMS, and then invites members to join the session according to the name list; (2) another type is the temporary group, which is not established before the session request is originated. The session request sent by the session originator to the server carries a list of members to be invited into the session. After receiving the request, the server resolves the list into a name list of members to be invited, and then sends a session request to the members to be invited.

The Open Mobile Alliance (OMA) defines the PoC according to the Session Initiation Protocol (SIP) and the Real-Time Transfer Protocol (RTP) defined by the Internet Engineering Task Force (IETF).

The SIP is used as a control plane of the PoC protocol. It enables registration and authentication of a user, defines, sets up and manages session processes, supports display of the online state of other users, and sends alerts between users.

Voice packets are transmitted through the RTP protocol. Most RTP links transmit voice packets, and the remaining is based on Real-Time Transfer Control Protocol (RTCP). The RTCP provides an arbitrator of talkers in a conference, and controls the quality of RTP sessions.

A typical PoC session setup process includes six stages: setting up a data channel, registering a user, reserving a user state, inviting/accepting a session, media transmission, and session termination.

In the process of setting up a session such as group session, chat group session and temporary group session predefined in the PoC service, the session participant may choose to disclose his/her own PoC address or join the session anonymously, namely, without providing the PoC address.

In the session process, a client with the right of controlling accession to a session may expel a participant out of the session according to the PoC address of the participant. The control is exercised by a request control server.

If an expelled user reattempts to join the session, the attempt succeeds only if these two conditions are met: the session is still in progress; and the number of participants has not reached the maximum number of members to the group. Specially, an expelled user is allowed to join the session again only if the session is still in progress and the number of participants has not reached the maximum number of participants to the group.

Different PoC group sessions impose different restrictions on the PoC users that join the session. For a predefined group or a restricted chat group, only the members of the group can join the session; for an unrestricted chat group, any PoC user can join the session; for a temporary group, only the PoC users who are invited at the time of setting up the session can join the session.

By researching the previous technology, the inventor discovers following technical problems: The prior art is unable to expel an anonymous user out of the current PoC session and is unable to control reattempts to join a session made by an expelled user.

The causes for such a problem are: The client with the right of controlling user's participation into a session can expel a user only by using the PoC address of the user in a PoC session. If the user joins a session anonymously, the client is unable to obtain the PoC address of the user, and thus unable to expel the user.

Besides, if an expelled user reattempts to join a session frequently, the session participant with the right of controlling user's participation into a session has to expel the user frequently, which imposes adverse effect on the PoC session quality.

SUMMARY

A method for controlling user's participation into a session in the PoC service provided in an embodiment of the present invention includes:

receiving the request of expelling a user sent by a client in the PoC session, with the synchronization source (SSRC) identifier or nickname of the user or an anonymous user wildcard carried in the request; and searching for the user's PoC address according to the received SSRC identifier or nickname of the user or an anonymous user wildcard, and expel the user out of the session according to the PoC address.

Further, a method for controlling user's participation into a session in the PoC service provided in an embodiment of the present invention includes:

receiving the request of expelling a user sent by a client in the PoC session, with the PoC address of the user carried in the request; and adding the PoC address in the request into the rejection list; and, if the user corresponding to the PoC address exists in the PoC session, expelling the user out of the PoC session.

Accordingly, an apparatus for controlling user accession to a session in the PoC service provided in an embodiment of the present invention includes:

an expulsion request receiving unit, adapted to receive the request of expelling a user in the PoC session, with the SSRC identifier and nickname of the user or an anonymous user wildcard carried in the request;

a judging and searching unit, connected to the expulsion request receiving unit and adapted to judge and search for the PoC address corresponding to the user according to the received SSRC identifier or nickname of the user or an anonymous user wildcard; and an expulsion executing unit, connected to the judging and searching unit and adapted to expel the user out of the session as required according to the found PoC address.

Further still, an apparatus for controlling user's participation into a session in the PoC service provided in an embodiment of the present invention includes:

an expulsion request receiving unit, adapted to receive the request of expelling a user sent by a client in the PoC session, with the PoC address of the user carried in the request;

an expulsion adding unit, connected to the expulsion request receiving unit and adapted to add the PoC address into the rejection list; and, if the user corresponding to the PoC address exists in the PoC session, expelling the user out of the PoC session.

a judging and rejecting unit, connected to the expulsion adding unit and adapted to judge whether the PoC address of the user to the PoC session exists in the rejection list, and, if so, reject the user from joining the PoC session.

As revealed in the previous technical solution in the embodiments of the present invention, a client in the PoC session sends a request of expelling a user to the control server, with the SSRC identifier and nickname of the user or an anonymous user wildcard carried in the request; according to the received SSRC identifier, nickname or anonymous user wildcard, the control server searches for the corresponding PoC address, and expels the user out of the session as required according to the PoC address; if the expelled reattempts to join the session, the control server can restrict the participation according to the expulsion policy. Therefore, the client with the expulsion right can control user's participation into the PoC session requested by other users, especially anonymous users, thus keeping order of the session and improving the quality of the session.

DETAILED DESCRIPTION

The present invention is described in detail hereinafter with reference to the embodiments and the accompanying drawings.

In the embodiments of the present invention, a client with the right of controlling participation into a session obtains the Synchronization Source (SSRC) identifier or nickname of other users or an anonymous user wildcard (which represents all anonymous users) in a PoC session, and controls user's participation into the PoC session accordingly. Especially, for the user who needs to be expelled, the control server finds the corresponding PoC address according to the user's SSRC identifier or nickname of the user or an anonymous wildcard, executes the expulsion, and adds the found PoC address into the rejection list. In this way, when the user is expelled out of the PoC session, the control server restricts the expelled user from reattempting to join the session automatically according to the rejection list.

In the session process, the client with the right of controlling participation into a session is unable to obtain the PoC address of the user who joins the session anonymously. However, when the PoC user sends an RTP media stream in the PoC session, or when the control server sends a "Talk Burst Taken" message, all other users can obtain the SSRC identifier of the current user. Therefore, the client with the right can obtain the SSRC identifier or nickname of the currently speaking user, and controls the participation by a user in the PoC session through the SSRC identifier or nickname, especially for the users who join the PoC session anonymously. Only non-anonymous users have nicknames. Nicknames are visible on the client, like the nicknames in ordinary chat rooms. The anonymous user wildcard is a symbol sent to the control server, which understands the symbol represents all anonymous users. Moreover, it is possible to expel all anonymous users according to the anonymous user wildcard.

Figure 1:
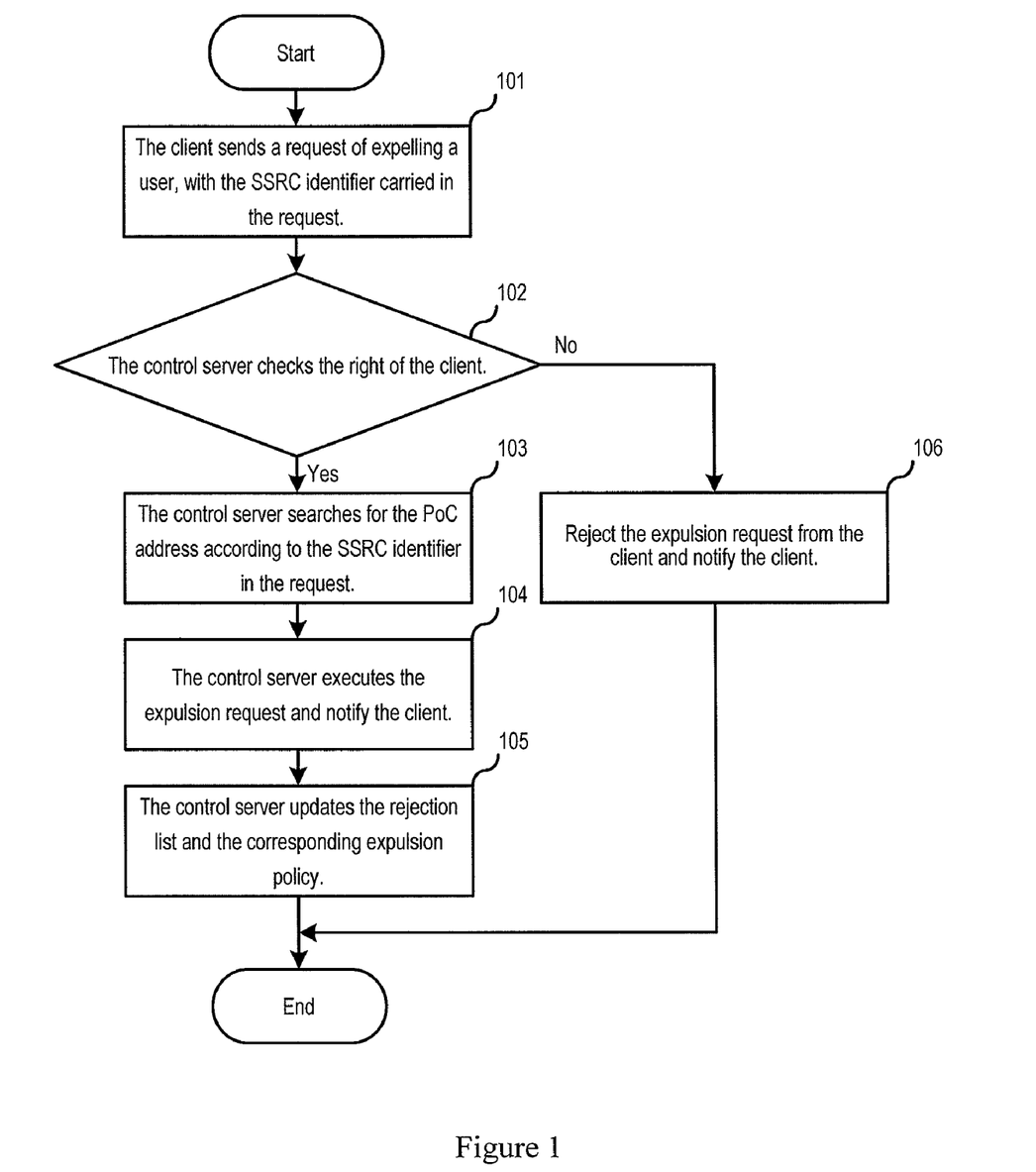
FIG. 1 is a flowchart of the method for controlling user's participation into a session in the PoC service according to the first embodiment of the present invention.

FIG. 1 is a flowchart of the method for controlling user accession to a session in the PoC service according to the first embodiment of the present invention. As shown in FIG. 1, the control server exchanges information with the client through SIP.

In step 101, the client in the PoC session can obtain the SSRC identifier of the currently speaking user from the received RTP media stream or a message inclusive of the SSRC identifier. When the client sends a request of expelling a user to the control server, the request carries the SSRC identifier of the user to be expelled and the corresponding expulsion policy. The expulsion policy may be the default setting in the rejection list. The expulsion request may be a BYE/REFER message in the SIP. If multiple users are expelled at a time, the Multipurpose Internet Mail Extensions (MIME) message body may carry a list of the users to be expelled, and the REFER-TO header of the Refer request carries the identifier of the list. If a single user is expelled at a time, the expulsion may be described in the REFER-TO message in the form of parameters.

The SSRC identifier and the expulsion policy may be carried in the Multipurpose Internet Mail Extensions (MIME) protocol message body in the Session Description Protocol (SDP) in the BYE/REFER message. The expulsion may be set in many ways. Two examples are: (1) Several expulsion policies are set and numbered in the control server beforehand, and the serial number of the expulsion policy in use is specified in the user expulsion request sent by the client to the control server; or (2) a default expulsion policy may be preset in the control server, and the default expulsion policy applies if the user expulsion request sent by the client to the control server does not specify an expulsion policy.

In step 102, when receiving the user expulsion request from the client, the control server checks the right of the client, and, if the right permits, proceeds to step 103, or else step 106.

In step 103, the control server searches for the corresponding PoC address according to the SSRC identifier in the request.

In step 104, according to the found PoC address, the control server expels the user out of the current session as required, and sends a message to the client that requests the expulsion, indicating that the expulsion request is executed. The message may be an ACCEPTED message in the SIP.

In step 105, after executing the expulsion, the control server adds the PoC address of the expelled user and the corresponding expulsion policy to the rejection list. Therefore, the rejection list may contain the PoC addresses of the users who need to be rejected from the session, or contain the rejection conditions corresponding to each PoC address, for example, rejecting participation before completion of the current session, or rejecting secondary participation within five minutes, and this procedure is finished.

In step 106, the control server rejects the request of the client and notifies the client, and this procedure is finished.

In the way mentioned above, the client with the right of controlling participation into a session can control participation into the PoC session requested by other users, especially anonymous users, thus providing an assurance for keeping order of the session.

Figure 2:
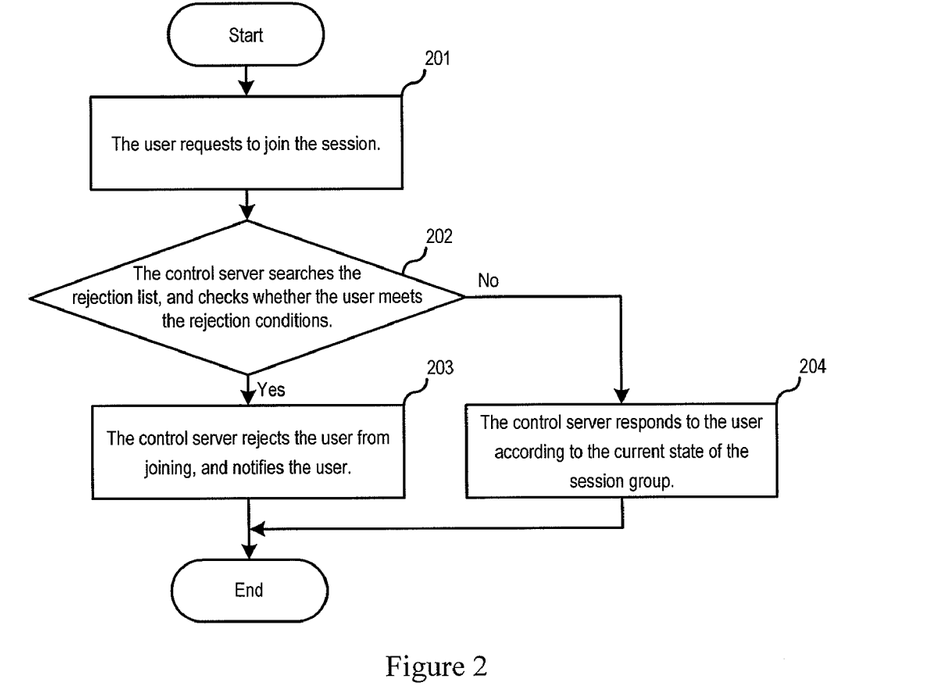
FIG. 2 is a flowchart of the method for controlling user's participation into a session in the PoC service according to the second embodiment of the present invention.

FIG. 2 is a flowchart of the method for controlling user accession to a session in the PoC service according to the second embodiment of the present invention. As shown in FIG. 2, the control server exchanges information with the client through SIP.

In step 201, an expelled user requests to join the current PoC session again.

In step 202, the control server queries the rejection list according to the request of the user. If the user exists in the rejection list and meets the expulsion policy (for example, the expulsion policy stipulates that an expelled user cannot join the session within 10 minutes after being expelled) and user A requests to join the session at the fifth minute after being expelled, the expulsion conditions are met, and step 203 will apply. If the rejection list or expulsion policy is not satisfied (the previous example applies) and user B requests to join the session at the 12th minute after being expelled, the expulsion conditions are not met, and step 204 will apply.

In step 203, the control server rejects the request of the user for joining the current PoC session directly, and notifies the user, and this procedure is finished. The control server automatically rejects the reattempt of the expelled user according to the rejection list and the rejection policy, thus preventing such users from harassing the PoC session maliciously, and improving the session quality.

In step 204, the control server responds to the user request for joining the session according to the prior art. For example, the user can join the session only if these two conditions are met: the session is still in progress; and the number of session participants has not reached the maximum number of members to the group. This procedure is finished.

The implementation according to the nickname or the anonymous user wildcard is similar to the previous two implementation modes, and is not repeated here any further.

Figure 3:
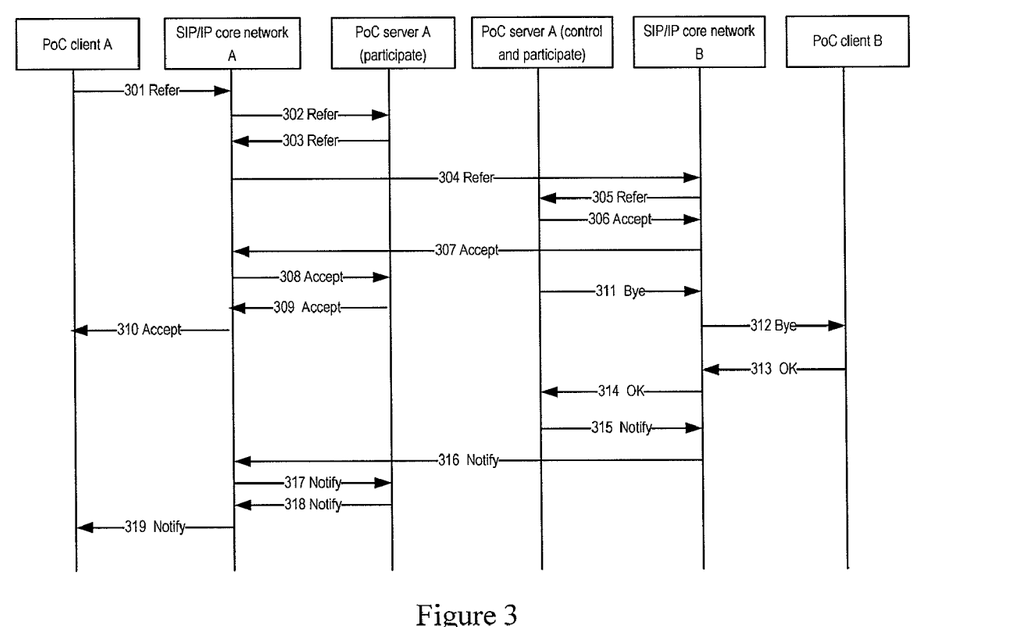
FIG. 3 shows the SIP message interaction when the technical solution under the present invention is implemented in a SIP-based network.

FIG. 3 shows the specific process of exchanging information through SIP and the relevant parameters in an embodiment of the present invention. See FIG. 3.

In step 301 to step 305, the PoC user A sends a request of expelling user B to the control server. Specifically, in step 301, the client A sends the request to the SIP/IP core network A; in step 302, the SIP/IP core network A forwards the request to the participation function server A; in step 303, the participation function server A sends the request to the SIP/IP core network A; in step 304, the SIP/IP core network A sends the request to the SIP/IP core network B; in step 305, the SIP/IP core network B sends the request to the control function server.

Listed below are fields related to the embodiments of the present invention:

Refer sip: session_id@domain_b.com SIP/2.0
From: UserA@(domain_a.com
Refer-to:<anonymous;SSRC=x;method=BYE>

Among the above fields, the first field indicates the session; the second field indicates the sender of the expulsion request; the third field indicates to expel the anonymous user whose SSRC value is "x", wherein if no SSRC parameter is provided, the user to be expelled is non-anonymous and needs to be expelled according to the nickname. The value of the third field may be in the following format:

Refer-to:<anonymous;nick_name=NameA; method=BYE>

After receiving the message, the control server checks the right of the originator. If the right check succeeds, the control server returns an Accept message to the sender of the expulsion request through step 306 to step 310. Then the control server works out the SIP URI of the user to be expelled (if all anonymous users need to be expelled, there are many SIP URIs), and the PoC user B is expelled through step 311 to step 314.

After user B is expelled, the SIP URI of user B is added into the rejection list, with a notification sent to user A through step 315 to step 319, notifying that user B has been expelled from the session.

In the previous methods, the user's SSRC identifier in the PoC session is used to control the user's participation into the session. General technicians can easily understand that such a practice can control both anonymous users and non-anonymous users, without departing from the spirit of the present invention.

Figure 4:
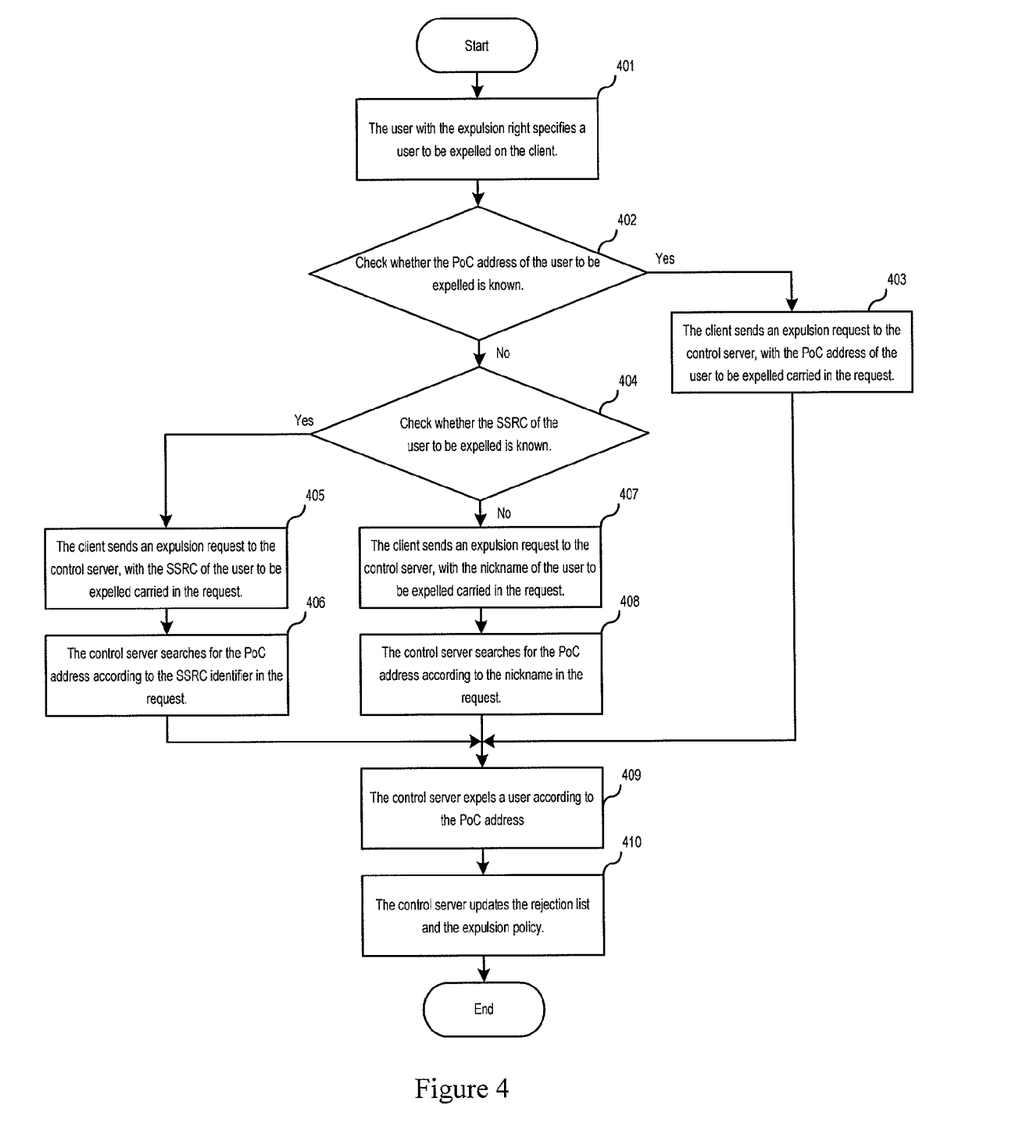
FIG. 4 is a flowchart of the method for controlling user's participation into a session in the PoC service according to the third embodiment of the present invention.

FIG. 4 is a flowchart of the method for controlling user's participation into a session in the PoC service according to the third embodiment of the present invention. See FIG. 4.

In step 401, the user with the expulsion right designates a user to be expelled on the client. One or more users can be designated for expulsion at a time.

In step 402 that follows, the client expels every user indicated by the received user instruction. The following steps assume that only one user is expelled at a time. If more than one user is expelled, it is only necessary to add the PoC address, the SSRC or nickname of the user to be expelled into the list directed by the Refer-to header of the Refer request. The way of judging whether to add the PoC address or SSRC or nickname of the user to be expelled into the list is the same as the case of expelling only one user, which is described in detail above and not repeated here any further.

In step 402, the client judges whether the PoC address of the user to be expelled is known, and, if so, proceeds to step 403, or else step 404. The client only knows the PoC address of non-anonymous users.

In step 403, the client sends an expulsion request to the control server, with the PoC address of the user to be expelled carried in the request. Afterwards, the procedure proceeds to step 409.

In step 404, the client judges whether the SSRC of the user to be expelled is known, and, if so, proceeds to step 405, or else step 407. The client contains the SSRC of the anonymous user only if the user has made a speech in the PoC session.

In step 405, the client sends an expulsion request to the control server, with the SSRC of the user to be expelled carried in the request.

In step 406 that follows, the control server searches for the corresponding PoC address according to the SSRC identifier in the request. Afterward, the procedure proceeds to step 409.

In step 407, the client sends an expulsion request to the control server, with the nickname of the user to be expelled carried in the request.

In step 408 that follows, the control server searches for the corresponding PoC address according to the nickname in the request. Afterward, the procedure proceeds to step 409.

In step 409, the control server expels the user according to the PoC address.

In step 410 that follows, the control server updates the rejection list of the PoC session, and adds the PoC address of the expelled user and the corresponding expulsion policy to the rejection list. Afterward, when a user requests to join the PoC session, the control server judges whether the PoC address of the user exists in the rejection list of the PoC session, and, if so, rejects the request, or else adds the user into the PoC session.

As revealed in the third embodiment, when the client sends an expulsion request, the parameter carried in the request is PoC address preferably, SSRC secondarily, or nickname at last. By preferring the PoC address, the step of the control server searching for the PoC address can be omitted, and the processing resources of the server can be saved. If no PoC address is available, the SSRC is preferred because the SSRC corresponds to a unique exactly and is helpful for expelling the user accurately. If neither PoC address nor SSRC is available, the nickname should be carried in the request. However, duplicate nicknames may exist in some systems. As a remedy to such a defect, the control server may judge whether the PoC session contains a duplicate nickname when the user joins the PoC session, and, if so, notify the new user to modify the nickname.

Figure 5:
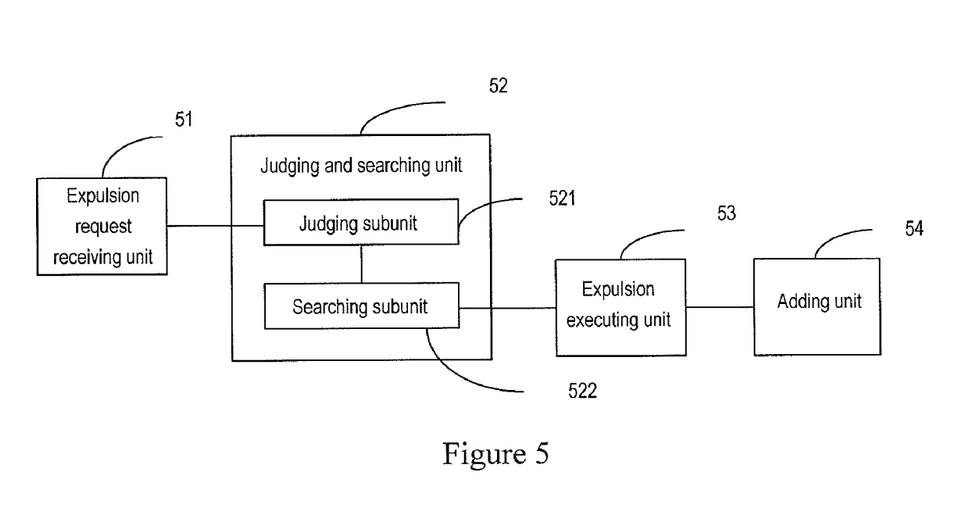
FIG. 5 shows the structure of an apparatus for controlling user's participation into a session in the PoC service according to the third embodiment of the present invention.

Accordingly, an apparatus for controlling user's participation into a session in the PoC service is provided in the fourth embodiment of the present invention. The apparatus may be located in the control server, or located separately in the network. The structure of the apparatus is shown in FIG. 5. The apparatus includes an obtaining unit 51, an expulsion request receiving unit 52, a judging and searching unit 54, an expulsion executing unit 54, and an adding unit 55. The obtaining unit 51 is used to obtain the SSRC identifier of the currently speaking user from the received RTP media stream or a message inclusive of the SSRC identifier. The expulsion request receiving unit 52 is connected to the obtaining unit 51 and adapted to send the request of expelling a user in the PoC session, with the SSRC identifier of the user carried in the request; the judging and searching unit 53 is connected to the expulsion request unit 52 and adapted to judge and search for the PoC address corresponding to the user according to the received SSRC identifier. The judging and searching unit 53 includes: a judging subunit 531, connected to the expulsion request receiving unit 532 and adapted to judge the rights of the client that sends the expulsion request; and a searching subunit 532, connected to the judging subunit 531 and adapted to search for the corresponding PoC address according to the SSRC identifier in the request sent by the client with the expulsion right. The expulsion executing unit 54 is connected to the searching subunit 532 and adapted to expelling the user out of the session as required according to the found PoC address. The adding unit 55 is connected to the expulsion executing unit 54 and adapted to add the PoC address of the expelled user and the corresponding expulsion policy to the rejection list.

The functions of the units in the apparatus are elaborated in the steps of the methods mentioned above, and are not repeated here any further.

Figure 6:
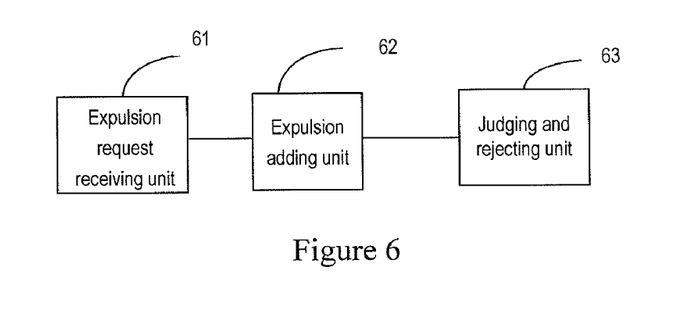
FIG. 6 shows another structure of an apparatus for controlling user's participation into a session in the PoC service according to the fourth embodiment of the present invention.

Accordingly, an apparatus for controlling user's participation into a session in the PoC service is provided in the fifth embodiment of the present invention. The apparatus may be located in the control server, or located separately in the network. The structure of the apparatus is shown in FIG. 6. The apparatus includes an expulsion request receiving unit 61, an expulsion adding unit 62, a judging and rejecting unit 63. The expulsion request receiving unit 61 is adapted to receive the request of expelling a user sent by a client in the PoC session, where the request carries the PoC address of the user to be expelled; the expulsion adding unit 62 is connected to the expulsion request receiving unit 61, and adapted to add the PoC address to the rejection list, or, if the user corresponding to the PoC address exists in the PoC session, expel the user out of the PoC session; the judging and rejecting unit 63 is connected to the expulsion adding unit 62, and adapted to judge whether the PoC address of the user who joins the PoC session exists in the rejection list, and, if so, reject the user from joining the PoC session.

The functions of the units in the apparatus are elaborated in the steps of the methods mentioned above, and are not repeated here any further.

Therefore, the embodiments of the present invention can expel both anonymous and non-anonymous users from the current PoC session; accordingly, the embodiments of the present invention can use expulsion policies to restrict an expelled user from joining the current session again, namely, automatically reject an expelled user from joining the session again through a rejection list and corresponding rejection policies, thus preventing such users from harassing the PoC session maliciously, and improving the service experience of the user and the quality of the session.

Although the invention has been described through some preferred embodiments and accompanying drawings, the invention is not limited to such embodiments. It is apparent that those skilled in the art can make various modifications and variations to the invention without departing from the spirit and scope of the invention.

What is claimed is:

1. A method for controlling user's participation into a session in a PoC service, comprising:
   receiving a request of expelling a user sent by a client in the PoC session, with a synchronization source (SSRC) identifier or a nickname of the user or an anonymous user wildcard carried in the request; and
   searching for a PoC address of the user according to the received SSRC identifier or nickname of the user or anonymous user wildcard, and expelling the user out of the session according to the PoC address.

2. The method for controlling user's participation into a session in a PoC service according to claim 1, comprising:
   by a client, obtaining the SSRC identifier of the currently speaking user from the received RTP media stream or a message inclusive of the SSRC identifier.

3. The method for controlling user's participation into a session in a PoC service according to claim 2, comprising: determining whether the client in the PoC session has the right of expelling a user.

4. The method for controlling user's participation into a session in a PoC service according to claim 3, comprising:
   sending a message to the client in the PoC session, indicating that the expulsion request is executed.

5. The method for controlling user's participation into a session in a PoC service according to claim 1, wherein the user expulsion request comprises a corresponding expulsion policy.

6. The method for controlling user's participation into a session in a PoC service according to claim 5, comprising:
   adding the PoC address of the expelled user and the corresponding expulsion policy to the rejection list; and
   when a user requests to join the PoC session, rejecting the user from joining the PoC session if determining that the user's PoC address exists in the rejection list and meets the expulsion policy.

7. The method for controlling user's participation into a session in a PoC service according to claim 6, wherein the relevant expulsion policy is implemented on the user existing in the rejection list, and expulsion policy is preset locally or is set in the session process through the client in the PoC session.

8. The method for controlling user's participation into a session in a PoC service according to claim 7, comprising:
   sending a rejection response to the user rejected from joining the PoC session.

9. The method for controlling user's participation into a session in a PoC service according to claim 5, wherein the client in the PoC session sends a request of expelling a user in the following process:
   for every user to be expelled, by the client, judging whether the PoC address of the user is known according to the information input by the user;
   if the user's PoC address is known, putting the user's PoC address into the user expulsion request sent to the control server so that the control server will expel the user according to the PoC address; or else judging whether SSRC identifier of the user is known;
   if the user's SSRC identifier is known, putting the user's SSRC identifier into the user expulsion request sent to the control server; or else putting the user's nickname into the user expulsion request sent to the control server.

10. A method for controlling user's participation into a session in a PoC service, comprising:
    receiving a request of expelling a user sent by a client in the PoC session, with a PoC address of the user carried in the request; and
    adding the PoC address in the request into a rejection list; and, if the user corresponding to the PoC address exists in the PoC session, expelling the user out of the PoC session,
    when an expelled user reattempts to join the current PoC session, if the user's PoC address exists in the rejection list and meets an expulsion policy, rejecting the user from joining the current PoC session; otherwise responding to the request of joining the session.

11. The method for controlling user's participation into a session in a PoC service according to claim 10, comprising:
    sending a rejection response to the user rejected from joining the session.

12. An apparatus for controlling user's participation into a session in a PoC service, comprising:
    an expulsion request receiving unit, adapted to receive the request of expelling a user in the PoC session, with an SSRC identifier and nickname of the user or an anonymous user wildcard carried in the request;
    a judging and searching unit, adapted to judge and search for a PoC address corresponding to the user according to the received SSRC identifier and nickname of the user or an anonymous user wildcard; and
    an expulsion executing unit, adapted to expel the user out of the session as required according to the found PoC address.

13. The apparatus for controlling user's participation into a session in a PoC service according to claim 12, wherein the judging and searching unit comprises:
    a judging subunit, adapted to judge the right of the client that sends an expulsion reject; and
    a searching subunit, adapted to search for the corresponding PoC address according to the SSRC identifier in the request sent by the client with the expulsion right.

14. The apparatus for controlling user's participation into a session in a PoC service according to claim 12, further comprising:
    an adding unit, adapted to add the PoC address of the expelled user and the corresponding expulsion policy to the rejection list.

15. An apparatus for controlling user's participation into a session in a PoC service, comprising:
- an expulsion request receiving unit, adapted to receive a request of expelling a user sent by a client in the PoC session, with a PoC address of the user carried in the request;
- an expulsion adding unit, adapted to add the PoC address into a rejection list;
- and, if the user corresponding to the PoC address exists in the PoC session, expelling the user out of the PoC session; and
- a judging and rejecting unit, adapted to judge whether the PoC address of the user to the PoC session exists in the rejection list, and, if so, reject the user from joining the PoC session.

16. The method for controlling user's participation into a session in a PoC service according to claim 10, comprising:
- sending a rejection response to the user rejected from joining the session.

* * * * *